United States Patent
Kumakura et al.

(10) Patent No.: US 12,114,123 B2
(45) Date of Patent: Oct. 8, 2024

(54) SOUND INPUT-OUTPUT CONTROL APPARATUS, SOUND INPUT-OUTPUT CONTROL METHOD, AND NON-TRANSITORY COMPUTER-READABLE MEDIUM

(71) Applicant: JVCKENWOOD Corporation, Yokohama (JP)

(72) Inventors: Hiroyuki Kumakura, Yokohama (JP); Katsumi Tomizawa, Yokohama (JP); Ryo Miyakuchi, Yokohama (JP); Hideki Takehara, Yokohama (JP); Naribumi Omata, Yokohama (JP); Jeong-ju Choe, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 143 days.

(21) Appl. No.: 17/898,441

(22) Filed: Aug. 29, 2022

(65) Prior Publication Data
US 2022/0417644 A1     Dec. 29, 2022

Related U.S. Application Data

(63) Continuation of application No. PCT/JP2020/043539, filed on Nov. 24, 2020.

(30) Foreign Application Priority Data

Mar. 24, 2020 (JP) .................... 2020-052622

(51) Int. Cl.
*H04R 1/10* (2006.01)
*H04R 5/033* (2006.01)

(52) U.S. Cl.
CPC ........... *H04R 1/1041* (2013.01); *H04R 5/033* (2013.01); *H04R 2420/07* (2013.01); *H04R 2430/01* (2013.01)

(58) Field of Classification Search
CPC .. H04R 1/1041; H04R 5/033; H04R 2420/07; H04R 2430/01
See application file for complete search history.

(56) References Cited

U.S. PATENT DOCUMENTS

| | | | |
|---|---|---|---|
| 7,596,237 B1* | 9/2009 | Constantin | H04R 25/552 381/314 |
| 9,866,975 B2* | 1/2018 | Secall | H04W 8/005 |

(Continued)

FOREIGN PATENT DOCUMENTS

| | | |
|---|---|---|
| JP | 2011524653 A | 9/2011 |
| WO | 2009126614 A1 | 10/2009 |

*Primary Examiner* — Oyesola C Ojo
(74) *Attorney, Agent, or Firm* — Procopio, Cory, Hargreaves & Savitch LLP

(57) ABSTRACT

A sound input-output control apparatus that can provide wider usage to a sound output apparatus are provided. The sound input-output control apparatus includes a distance determination unit configured to determine whether the distance between at least two of a plurality of sound output apparatuses each independently mounted on a user and configured to output sound toward the user is equal to or longer than a predetermined distance, and an operation control unit configured to control each of the sound output apparatuses to perform first operation when the distance between at least two of the plurality of sound output apparatuses is shorter than the predetermined distance, and control each of the sound output apparatuses to perform second operation when the distance between at least two of the plurality of sound output apparatuses is equal to or longer than the predetermined distance.

7 Claims, 8 Drawing Sheets

(56) References Cited

U.S. PATENT DOCUMENTS

| | | | |
|---|---|---|---|
| 10,051,385 B2* | 8/2018 | Edwards | H04R 25/552 |
| 11,425,486 B2* | 8/2022 | Koss | H04W 76/20 |
| 11,921,968 B2* | 3/2024 | Xu | H04M 1/72415 |
| 11,924,613 B2* | 3/2024 | Sahgal | G10L 25/18 |
| 2014/0321682 A1* | 10/2014 | Kofod-Hansen | H04R 25/30 |
| | | | 381/315 |
| 2018/0279038 A1* | 9/2018 | Boesen | H04W 76/10 |
| 2019/0166428 A1* | 5/2019 | Bae | H04M 1/6066 |

* cited by examiner

SOUND INPUT-OUTPUT CONTROL APPARATUS, SOUND INPUT-OUTPUT CONTROL METHOD, AND NON-TRANSITORY COMPUTER-READABLE MEDIUM

CROSS REFERENCE TO RELATED APPLICATION

This application is based upon and claims the benefit of priority from Japanese patent application No. 2020-52622, filed on Mar. 24, 2020, the disclosure of which is incorporated herein in its entirety by reference.

BACKGROUND

The present invention relates to a sound input-output control apparatus, a sound input-output control method, and a non-transitory computer-readable medium.

Published Japanese Translation of PCT International Publication for Patent Application, No. 2011-524653 discloses an earphone configured to receive streaming audio data through an ad hoc wireless network and an infrastructure wireless network. Specifically, when a data source exists in the range of communication with an earphone through an ad hoc wireless network, the earphone receives streaming audio data from the data source through the ad hoc wireless network. When no data source exists in the range of communication with the earphone through an ad hoc wireless network, the earphone receives streaming audio data through an infrastructure wireless network.

SUMMARY

Full-wireless earphones (true wireless stereo (TWS)) that are completely wireless right and left earphones have been spreading recently. The full-wireless earphones output sound in a stereo scheme from the right and left earphones. The present inventors have come up with a technology that enables an operation mode other than a normal operation mode of stereo-scheme sound outputting for a plurality of sound output apparatuses that are independently usable like full-wireless earphones.

A sound input-output control apparatus according to the present embodiments is a sound input-output control apparatus configured to control a plurality of sound output apparatuses each independently mounted on a user and configured to output sound toward the user, and includes: a distance determination unit configured to determine whether a distance between at least two of the plurality of sound output apparatuses is equal to or longer than a predetermined distance; and an operation control unit configured to configured to control each of the sound output apparatuses to perform first operation when it is determined by the distance determination unit that the distance between at least two of the plurality of sound output apparatuses is shorter than the predetermined distance, and control each of the sound output apparatuses to perform second operation when it is determined by the distance determination unit that the distance between at least two of the plurality of sound output apparatuses is equal to or longer than the predetermined distance.

A sound input-output control method according to the present embodiments is a sound input-output control method in which a plurality of sound output apparatuses each independently mounted on a user and configured to output sound toward the user are controlled by a sound input-output control apparatus, and the sound input-output control apparatus determines whether a distance between at least two of the plurality of sound output apparatuses is equal to or longer than a predetermined distance, controls each of the sound output apparatuses to perform first operation when having determined that the distance between at least two of the plurality of sound output apparatuses is shorter than the predetermined distance, and controls each of the sound output apparatuses to perform second operation when having determined that the distance between at least two of the plurality of sound output apparatuses is equal to or longer than the predetermined distance.

A non-transitory computer-readable medium according to the present embodiments is a non-transitory computer-readable medium that stores a computer program that causes a sound input-output control apparatus to execute processing of controlling a plurality of sound output apparatuses each independently mounted on a user and configured to output sound toward the user, the computer program causing the sound input-output control apparatus to execute processing of determining whether a distance between at least two of the plurality of sound output apparatuses is equal to or longer than a predetermined distance; and processing of controlling each of the sound output apparatuses to perform first operation when having determined that the distance between at least two of the plurality of sound output apparatuses is shorter than the predetermined distance, and controlling each of the sound output apparatuses to perform second operation when having determined that the distance between at least two of the plurality of sound output apparatuses is equal to or longer than the predetermined distance.

DETAILED DESCRIPTION

First Embodiment

Embodiments of the present invention will be described below with reference to the accompanying drawings.

Figure 1:
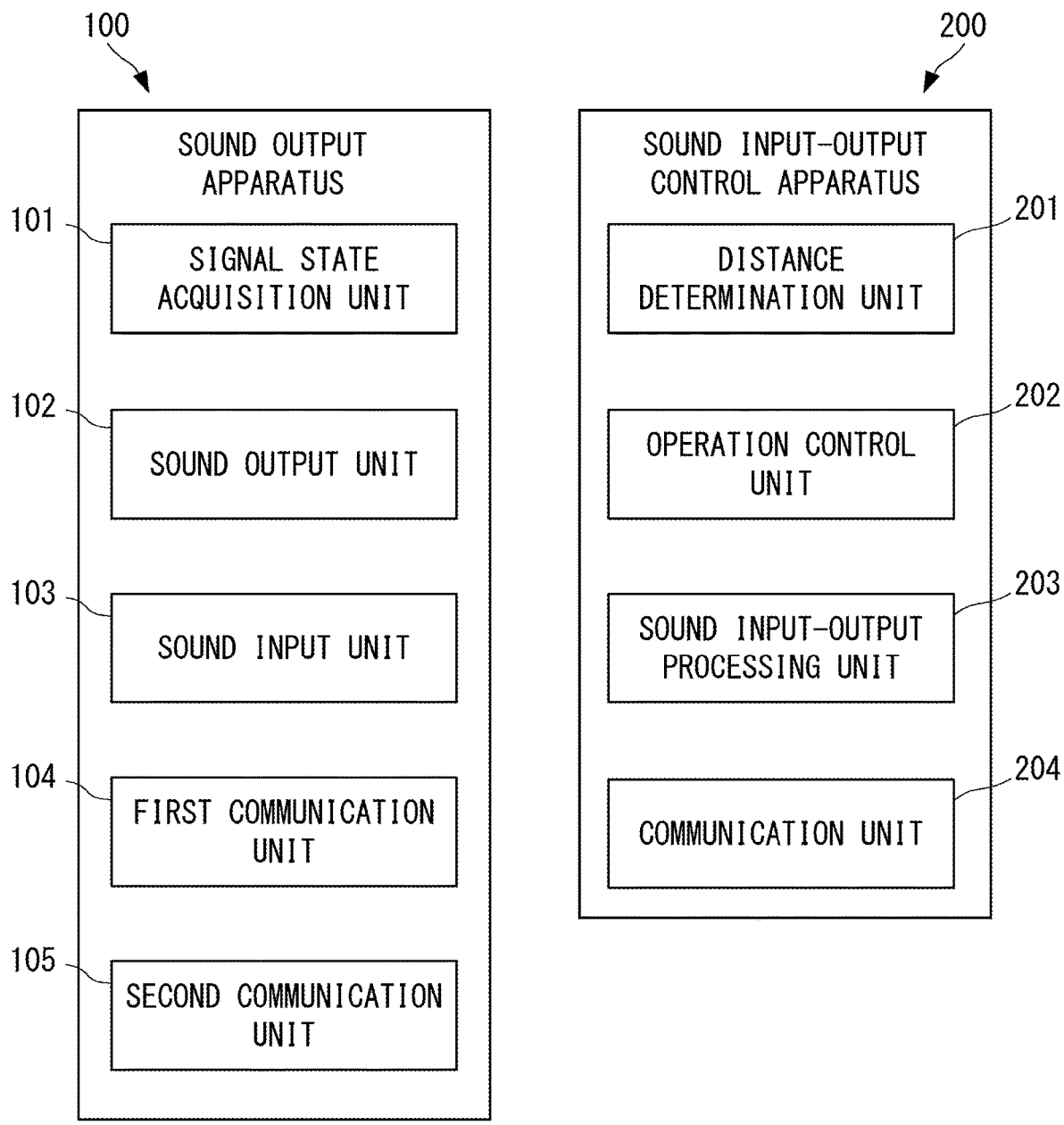
FIG. 1 is a block diagram schematically illustrating the configuration of a sound input-output control apparatus according to a first embodiment of the present invention.

FIG. 1 is a block diagram schematically illustrating the configuration of a sound input-output control apparatus 200 according to a first embodiment of the present invention. The sound input-output control apparatus 200 controls operation of a sound output apparatus 100 illustrated in FIG. 1. Specifically, the sound input-output control apparatus 200 controls a plurality of sound output apparatuses 100 each independently mounted on a user and configured to output sound toward the user. Accordingly, the sound input-output control apparatus 200 can provide wider usage to the sound output apparatuses 100.

Each sound output apparatus 100 is, for example, a completely independent individual earphone such as a full-wireless earphone or a full-wireless bone-conduction earphone, and independently mounted on, for example, the right or left ear of a user. In other words, the plurality of sound output apparatuses 100 are mounted completely independently from each other on a user. Typically, full-wireless earphones, full-wireless bone-conduction earphones, or the like are provided in a set of two completely independent earphones. However, in the present invention, the sound output apparatuses 100 may be provided in a set of three apparatuses or more. The plurality of sound output apparatuses 100 may be independently mounted on the right and left cheekbones of the user and may be neck-mounted speakers or wearable speakers. The sound output apparatuses 100 are not limited to a full-wireless type but some of them may be of wired connection.

As illustrated in FIG. 1, the sound output apparatus 100 according to the first embodiment includes a signal state acquisition unit 101, a sound output unit 102, a sound input unit 103, a first communication unit 104, and a second communication unit 105. Note that only at least one sound output apparatus 100 in a set of sound output apparatuses 100 needs to include to the signal state acquisition unit 101 and the sound input unit 103, and any other sound output apparatus 100 may include neither the signal state acquisition unit 101 nor the sound input unit 103. All sound output apparatuses 100 in the sets may include no sound input unit 103.

The signal state acquisition unit 101 acquires a signal state in communication among a plurality of sound output apparatuses 100. The signal state means reception sensitivity of a signal that a sound output apparatus 100 including the signal state acquisition unit 101 receives from another sound output apparatus 100. Examples of communication among the plurality of sound output apparatuses 100 include near-field magnetic induction (NFMI) communication, and short-distance wireless communication such as Bluetooth (registered trademark), wireless LAN such as Wi-Fi (registered trademark), infrared communication, or near-field communication (NFC). The signal state acquired by the signal state acquisition unit 101 is transmitted to the sound input-output control apparatus 200 by the first communication unit 104. Note that the signal state acquisition unit 101 may be included in every sound output apparatus 100 in the set of sound output apparatuses 100 or may be included in at least one sound output apparatus 100. When the signal state acquisition unit 101 is included in only one sound output apparatus 100 in the set of sound output apparatuses 100, the sound output apparatus 100 including the signal state acquisition unit 101 may be set as a master apparatus and any other the sound output apparatus 100 may be set as a slave apparatus.

The communication format of a signal of the signal state acquired by the signal state acquisition unit 101 may be different from a communication format used for sound signal transmission-reception among the plurality of sound output apparatuses 100. For example, when near-field magnetic induction communication is used for sound signal transmission-reception among the plurality of sound output apparatuses 100 and a wireless LAN is used for sound signal transmission-reception among the plurality of sound output apparatuses 100, the signal state acquisition unit 101 may acquire, as the above-described signal state, reception sensitivity of infrared communication among the plurality of sound output apparatuses 100.

The sound output unit 102 includes a speaker or a bone-conduction speaker and outputs sound toward the user in accordance with a sound signal acquired from a portable instrument such as a smartphone or from a music playback apparatus (not illustrated) such as a digital audio player (DAP) or a CD player. The sound signal from the music playback apparatus may be received by the first communication unit 104 through the sound input-output control apparatus 200 or may be directly received by the first communication unit 104 not through the sound input-output control apparatus 200.

The sound output unit 102 may output sound toward the user in accordance with a sound signal received by the second communication unit 105 from another sound output apparatus 100. Specifically, the sound input unit 103 of the other sound output apparatus 100 acquires a sound signal by collecting sound, and the sound output unit 102 outputs the sound in accordance with the sound signal received by the second communication unit 105 from the other sound output apparatus 100.

The sound input unit 103 is a microphone or the like and acquires a sound signal by collecting sound of the user on which the sound output apparatus 100 is mounted. Note that the sound input unit 103 can collect sound of the user with the sound output apparatus 100 being mounted on the user. The sound signal acquired by the sound input unit 103 is transmitted to the sound input-output control apparatus 200 or another sound output apparatus 100 by the second communication unit 105. Note that the sound input unit 103 may be included in every sound output apparatus 100 in the set of sound output apparatuses 100 or may be included in at least one sound output apparatus 100. When the sound input unit 103 is included in only one sound output apparatus 100 in the set of sound output apparatuses 100, the sound output apparatus 100 including the sound input unit 103 may be set as a master apparatus and any other sound output apparatus 100 may be set as a slave apparatus.

The first communication unit 104 performs communication between the sound output apparatus 100 including the first communication unit 104 and each of any other sound output apparatus 100, the sound input-output control apparatus 200, and the music playback apparatus (not illustrated). For example, the first communication unit 104 performs sound signal transmission and reception between the sound output apparatus 100 and each of any other sound output apparatus 100, the sound input-output control apparatus 200, and the music playback apparatus. The first communication unit 104 transmits the signal state from the sound output apparatus 100 to the sound input-output control apparatus 200. In addition, the first communication unit 104 receives a control signal for controlling the sound output apparatus 100 from the sound input-output control apparatus 200.

Communication between sound output apparatuses 100 by the first communication unit 104 is near-field magnetic induction (NFMI) communication, and short-distance wireless communication such as Bluetooth (registered trademark), wireless LAN such as Wi-Fi (registered trademark), infrared communication, or near-field communication (NFC). Which of the communications is used as communication between sound output apparatuses 100 by the first communication unit 104 may be switched in accordance with the distance between the sound output apparatuses 100.

Communication between the sound output apparatus 100 and each of the sound input-output control apparatus 200 and the music playback apparatus by the first communication unit 104 is, for example, short-distance wireless communication such as Bluetooth (registered trademark), wireless LAN such as Wi-Fi (registered trademark), infrared communication, or NFC. Which of the communications is used as communication between the sound output apparatus 100 and each of the sound input-output control apparatus 200 and the music playback apparatus by the first communication unit 104 may be switched in accordance with the distance between the sound output apparatus 100 and each of the sound input-output control apparatus 200 and the music playback apparatus.

The second communication unit 105 performs communication between the sound output apparatus 100 including the second communication unit 105 and any other sound output apparatus 100 or the above-described music playback apparatus (not illustrated). For example, the second communication unit 105 performs sound signal transmission and reception between the sound output apparatus 100 and any other sound output apparatus 100.

Communication between sound output apparatuses 100 by the second communication unit 105 is short-distance wireless communication such as Bluetooth (registered trademark), wireless LAN such as Wi-Fi (registered trademark), infrared communication, or near-field communication (NFC). Which of the communications is used as communication between sound output apparatuses 100 by the second communication unit 105 may be switched in accordance with the distance between the sound output apparatuses 100.

Note that the first communication unit 104 and the second communication unit 105 may be one communication unit. In this case, communication between the sound output apparatus 100 and each of any other sound output apparatus 100, the sound input-output control apparatus 200, and the music playback apparatus (not illustrated) is, for example, near-field magnetic induction communication or short-distance wireless communication such as Bluetooth (registered trademark), wireless LAN such as Wi-Fi (registered trademark), infrared communication, or NFC. Which of the communications is used as the communication may be switched in accordance with the distance between the sound output apparatus 100 and each of any other sound output apparatus 100, the sound input-output control apparatus 200, and the music playback apparatus (not illustrated). When communication of the same format is used as the communication, signal output intensity may be switched in accordance with the distance between the sound output apparatus 100 and each of any other sound output apparatus 100, the sound input-output control apparatus 200, and the music playback apparatus (not illustrated). For example, communication in a mode of low output intensity may be performed in sound-signal communication between sound output apparatuses 100, and communication in a mode of high output intensity may be performed in sound-signal communication between sound output apparatus 100 and the sound input-output control apparatus 200 or the music playback apparatus.

As described above, the sound input-output control apparatus 200 controls the plurality of sound output apparatuses 100 each independently mounted on a user and configured to output sound toward the user. For example, the sound input-output control apparatus 200 controls at least two sound output apparatuses 100 in the set of sound output apparatuses 100. As illustrated in FIG. 1, the sound input-output control apparatus 200 includes a distance determination unit 201, an operation control unit 202, a sound input-output processing unit 203, and a communication unit 204.

The distance determination unit 201 determines whether the distance among the plurality of sound output apparatuses 100 is equal to or longer than a predetermined distance. Specifically, the distance determination unit 201 determines whether the distance among the plurality of sound output apparatuses 100 is equal to or longer than the predetermined distance based on the signal state in communication among the plurality of sound output apparatuses 100. More specifically, the communication unit 204 of the sound input-output control apparatus 200 receives, as the signal state from at least one sound output apparatus 100 in the set of sound output apparatuses 100, reception sensitivity of a signal that the sound output apparatus 100 receives from another sound output apparatus 100. Then, the distance determination unit 201 determines whether the distance between the sound output apparatus 100 and the other sound output apparatus is equal to or longer than the predetermined distance based on the signal state (reception sensitivity) received by the communication unit 204. In this case, the predetermined distance is a distance for determining whether each sound output apparatus 100 is mounted on the same user, and is, for example, 1 m or 50 cm. For example, in a case in which the predetermined distance is 1 m, the distance determination unit 201 determines that the distance among the plurality of sound output apparatuses 100 is equal to or longer than the predetermined distance (in this example, 1 m) when the reception sensitivity is lower than communication threshold intensity when the distance among the plurality of sound output apparatuses 100 is 1 m.

The operation control unit 202 controls operation of each sound output apparatus 100 in the set of sound output apparatuses 100.

Specifically, when it is determined by the distance determination unit 201 that the distance among the plurality of sound output apparatuses 100 is shorter than the predetermined distance, the operation control unit 202 controls each sound output apparatus 100 to perform first operation that is suitable for a case in which the sound output apparatuses 100 are mounted on the same user, for example, operation of playing back a sound signal acquired from the music playback apparatus in a stereo mode. When it is determined that the distance among the plurality of sound output apparatuses 100 is shorter than the predetermined distance, the operation control unit 202 may perform operation designated by the user or continue normal operation without performing specified operation as the first operation. In other words, the first operation does not necessarily need to be particularly designated operation.

When it is determined by the distance determination unit 201 that the distance among the plurality of sound output apparatuses 100 is equal to or longer than the predetermined distance, the operation control unit 202 controls each sound output apparatus 100 to perform second operation that is suitable for a case in which the sound output apparatuses 100 are mounted on different users, for example, operation of playing back a sound signal acquired from the music playback apparatus in a monaural mode.

The above-described first operation and the above-described second operation will be described later in detail.

Thus, in a case in which the set of sound output apparatuses 100 consists of two sound output apparatuses 100, the sound input-output control apparatus 200 according to the first embodiment determines that the two sound output apparatuses 100 are mounted on the same user when the distance between the two sound output apparatuses 100 is shorter than the predetermined distance. Then, the sound input-output control apparatus 200 controls the two sound output apparatuses 100 to perform the above-described first operation.

In a case in which the set of sound output apparatuses 100 consists of two sound output apparatuses 100, the sound input-output control apparatus 200 determines that the two sound output apparatuses 100 are mounted on different users when the distance between the two sound output apparatuses 100 is equal to or longer than the predetermined distance. Then, the sound input-output control apparatus 200 controls the two sound output apparatuses 100 to perform the above-described second operation.

In a case in which the set of sound output apparatuses 100 consists of three or more sound output apparatuses 100, the sound input-output control apparatus 200 determines that the two sound output apparatuses 100 are mounted on the same user when the distance between two sound output apparatuses 100 in the set of sound output apparatuses 100 is shorter than the predetermined distance. Simultaneously, when the distance to the other sound output apparatus 100 in the set of sound output apparatuses 100 is equal to or longer than the predetermined distance, the sound input-output control apparatus 200 determines that the other sound output apparatus 100 in the set of sound output apparatuses 100 is mounted on a different user. Then, the sound input-output control apparatus 200 controls the two sound output apparatuses 100 to perform the above-described first operation and controls the other sound output apparatus 100 to perform the above-described second operation.

In a case in which the set of sound output apparatuses 100 consists of three or more sound output apparatuses 100, the sound input-output control apparatus 200 determines that the sound output apparatuses 100 are mounted on different users when the distance between any two of the sound output apparatuses 100 is equal to or longer than the predetermined distance. Then, the sound input-output control apparatus 200 controls the sound output apparatuses 100 to perform the above-described second operation.

The sound input-output processing unit 203 generates a sound signal to be transmitted to each sound output apparatus 100 by performing predetermined processing on a sound signal received by the communication unit 204 from the music playback apparatus (not illustrated). For example, the sound input-output processing unit 203 generates a stereo-scheme sound signal or a monaural-scheme sound signal. Then, the sound signal generated by the sound input-output processing unit 203 is transmitted to each sound output apparatus 100 by the communication unit 204.

For example, when the set of sound output apparatuses 100 consists of a right-ear sound output apparatus 100 and a left-ear sound output apparatus 100 and the sound output apparatuses 100 are mounted on the same user, the first operation is performed in which the sound input-output processing unit 203 generates a right-ear sound signal and a left-ear sound signal and the communication unit 204 transmits the right-ear sound signal generated by the sound input-output processing unit 203 to the right-ear sound output apparatus 100 and transmits the left-ear sound signal generated by the sound input-output processing unit 203 to the left-ear sound output apparatus 100. In other words, the first operation is stereo-scheme sound signal playback operation (one-person mode).

When the set of sound output apparatuses 100 are mounted on different users, the second operation is performed in which the sound input-output processing unit 203 generates a monaural-scheme sound signal and the communication unit 204 transmits the monaural-scheme sound signal to each sound output apparatus 100.

When the set of sound output apparatuses 100 are mounted on different users, the second operation may be performed in which the sound input-output processing unit 203 acquires a sound signal collected by the sound input unit 103 and the communication unit 205 transmits the collected sound signal to another sound output apparatus 100. In other words, the second operation may be communication operation (transceiver mode) between different users through the sound output apparatuses 100. In the transceiver mode, transmission-reception may be unidirectional, or bidirectional transmission-reception may be possible.

The second operation may be an operation mode in which, for example, sound volume or sound quality adjustment of sound outputting can be separately set as described later.

The communication unit 204 performs communication between the sound input-output control apparatus 200 and each sound output apparatus 100 and communication between the sound input-output control apparatus 200 and the music playback apparatus (not illustrated).

Communication between the sound input-output control apparatus 200 and each sound output apparatus 100 and communication between the sound input-output control apparatus 200 and the music playback apparatus are, for example, short-distance wireless communication such as Bluetooth (registered trademark), wireless LAN such as Wi-Fi (registered trademark), infrared communication, or NFC. Which of the communications is used as communication between the sound input-output control apparatus 200 and each sound output apparatus 100 and between the sound input-output control apparatus 200 and the music playback apparatus may be switched in accordance with the distance between the sound input-output control apparatus 200 and the sound output apparatus 100 and between the sound input-output control apparatus 200 and the music playback apparatus.

Note that the sound input-output control apparatus 200 may be integrated with a portable instrument such as a smartphone or with a music playback apparatus such as a DAP or a CD player. In this case, the communication unit 204 performs communication between the sound input-output control apparatus 200 and each sound output apparatus 100. An application program that causes the music playback apparatus to execute the above-described function of the sound input-output control apparatus 200 may be installed.

Subsequently, exemplary sound input-output control methods according to the first embodiment of the present invention will be described below with reference to FIGS. 2 to 4. Note that the following description is made on an example in which the set of sound output apparatuses 100 consists of two sound output apparatuses 100, one of the sound output apparatuses 100 is a master apparatus, and the other sound output apparatus 100 is a slave apparatus. In addition, when the two sound output apparatuses 100 are mounted on the same user, one of the sound output apparatuses 100 is mounted on the left ear and the other sound output apparatus 100 is mounted on the right ear.

First, an exemplary sound input-output control method illustrated in FIG. 2 will be described below.

First, the signal state acquisition unit 101 of the sound output apparatus 100 as the master apparatus acquires the signal state in communication between the sound output apparatus 100 and the sound output apparatus 100 as the slave apparatus (step S101). The signal state acquired by the signal state acquisition unit 101 is transmitted to the sound input-output control apparatus 200 by the first communication unit 104.

Subsequently, the distance determination unit 201 determines whether the distance among the plurality of sound output apparatuses 100 is equal to or longer than the predetermined distance based on the signal state acquired at step S101 (step S102).

At step S102, when the distance among the plurality of sound output apparatuses 100 is shorter than the predetermined distance (Yes at step S102), the operation control unit 202 controls the right-ear sound output apparatus 100 and the left-ear sound output apparatus 100 to operate in a sound output mode (first operation) (step S103).

Then, the normal operation is performed at the right-ear sound output apparatus 100 and the left-ear sound output apparatus 100 (step S104). Specifically, the sound input-output processing unit 203 generates a right-ear sound signal and a left-ear sound signal, and the communication unit 204 transmits the right-ear sound signal to the right-ear sound output apparatus 100 and transmits the left-ear sound signal to the left-ear sound output apparatus 100. Then, the sound output unit 102 of the right-ear sound output apparatus 100 outputs sound toward the user in accordance with the right-ear sound signal, and the sound output unit 102 of the left-ear sound output apparatus 100 outputs sound toward the user in accordance with the left-ear sound signal.

At step S102, when the distance among the plurality of sound output apparatuses 100 is equal to or longer than the predetermined distance (No at step S102), the operation control unit 202 controls the right-ear sound output apparatus 100 and the left-ear sound output apparatus 100 to operate in the transceiver mode (second operation) (step S105).

Then, a sound signal of the user, which is collected by the microphone (sound input unit) 103 of one of the sound output apparatuses 100 is transmitted to the other sound output apparatus 100, the other sound output apparatus 100 receives the sound signal, and the sound output unit 102 of the other sound output apparatus 100 outputs sound toward the user in accordance with the sound signal (step S106). For example, voice of a user on which the right-ear sound output apparatus 100 is mounted is collected by the microphone (sound input unit) 103 of the right-ear sound output apparatus 100 and transmitted to the left-ear sound output apparatus 100. Then, the sound output unit 102 of the left-ear sound output apparatus 100 outputs, in accordance with the sound signal, sound toward a user on which the left-ear sound output apparatus 100 is mounted. Similarly, voice of the user on which the left-ear sound output apparatus 100 is mounted is collected by the microphone (sound input unit) 103 of the left-ear sound output apparatus 100 and transmitted to the right-ear sound output apparatus 100. Then, the sound output unit 102 of the right-ear sound output apparatus 100 outputs, in accordance with the sound signal, sound toward the user on which the right-ear sound output apparatus 100 is mounted. Accordingly, the right-ear sound output apparatus 100 and the left-ear sound output apparatus 100 can be used transceivers when the right-ear sound output apparatus 100 and the left-ear sound output apparatus 100 are mounted on different users.

Note that, in the above-described transceiver mode, the operation control unit 202 may control each sound output apparatus 100 to stop sound outputting based on a sound signal from the sound output unit 102 or to decrease the volume of sound outputting based on the sound signal. Alternatively, in the above-described transceiver mode, the operation control unit 202 may control one of the right-ear sound output apparatus 100 and the left-ear sound output apparatus 100 to stop collection by the sound input unit 103 at the sound output apparatus 100.

Subsequently, an exemplary sound input-output control method illustrated in FIG. 3 will be described below. In the sound input-output control method illustrated in FIG. 3, processing at steps S201, S202, and S204 is the same as processing at steps S101, S102, and S104, respectively, in the sound input-output control method illustrated in FIG. 2, and thus description thereof is omitted.

At step S202, when the distance among the plurality of sound output apparatuses 100 is shorter than the predetermined distance (Yes at step S202), the operation control unit 202 controls the right-ear sound output apparatus 100 and the left-ear sound output apparatus 100 to operate in the one-person mode (first operation) (step S203).

At step S202, when the distance among the plurality of sound output apparatuses 100 is equal to or longer than the predetermined distance (No at step S202), the operation control unit 202 controls the right-ear sound output apparatus 100 and the left-ear sound output apparatus 100 to operate in a two-person mode (second operation) (step S205).

Then, the right-ear sound output apparatus 100 and the left-ear sound output apparatus 100 play back music in the monaural scheme (step S206). Specifically, the sound input-output processing unit 203 generates a monaural-scheme sound signal, and the communication unit 204 transmits the monaural-scheme sound signal to the right-ear sound output apparatus 100 and the left-ear sound output apparatus 100. Then, the sound output unit 102 of the right-ear sound output apparatus 100 and the sound output unit 102 of the left-ear sound output apparatus 100 each output sound toward the user in accordance with this monaural-scheme sound signal.

Subsequently, an exemplary sound input-output control method illustrated in FIG. 4 will be described below. In the sound input-output control method illustrated in FIG. 4, processing at steps S301, S302, S303, and S305 is the same as processing at steps S201, S202, S203, and S205, respectively, in the sound input-output control method illustrated in FIG. 3, and thus description thereof is omitted.

At step S303, after the right-ear and left-ear sound output apparatuses 100 are controlled to operate in the one-person mode (first operation), simultaneous adjustment (normal operation) of sound volume, sound quality, and the like is performed at the right-ear sound output apparatus 100 and the left-ear sound output apparatus 100 (step S304). Specifically, the sound input-output processing unit 203 generates a right-ear sound signal and a left-ear sound signal, and the communication unit 204 transmits the right-ear sound signal to the right-ear sound output apparatus 100 and transmits the left-ear sound signal to the left-ear sound output apparatus 100. For example, the operation control unit 202 simultaneously adjusts the volume and quality of sound output from the sound output unit 102 at each of the right-ear and left-ear sound output apparatuses 100 to the same volume and quality in effect. Then, the sound output unit 102 of the right-ear sound output apparatus 100 outputs sound toward a user in accordance with the right-ear sound signal, and the sound output unit 102 of the left-ear sound output apparatus 100 outputs sound toward the user in accordance with the left-ear sound signal.

At step S305, after the right-ear and left-ear sound output apparatuses 100 are controlled to operate in the two-person mode (second operation), adjustment of sound volume and sound quality is individually performed at the right-ear sound output apparatus 100 and the left-ear sound output apparatus 100 (step S306). Specifically, the sound input-output processing unit 203 generates a right-ear sound signal and a left-ear sound signal, and the communication unit 204 transmits the right-ear sound signal to the right-ear sound output apparatus 100 and transmits the left-ear sound signal to the left-ear sound output apparatus 100. For example, the operation control unit 202 can individually adjust the volume and quality of sound output from the sound output unit 102 at each of the right-ear and left-ear sound output apparatuses 100. For example, the sound input-output control apparatus 200 or the music playback apparatus separately displays, on an own display unit (not illustrated), a setting screen for adjusting sound volume and sound quality for the right ear and a setting screen for adjusting sound volume and sound quality for the left ear. Accordingly, a user on which the right-ear sound output apparatus 100 is mounted and a user on which the left-ear sound output apparatus 100 is mounted can operate each setting screen to apply preferable settings for each user to the sound volume and sound quality of the right-ear sound output apparatus 100 and the left-ear sound output apparatus 100. Then, the sound output unit 102 of the right-ear sound output apparatus 100 outputs sound toward the user in accordance with the right-ear sound signal, and the sound output unit 102 of the left-ear sound output apparatus 100 outputs sound toward the user in accordance with the left-ear sound signal.

Second Embodiment

Figure 5:
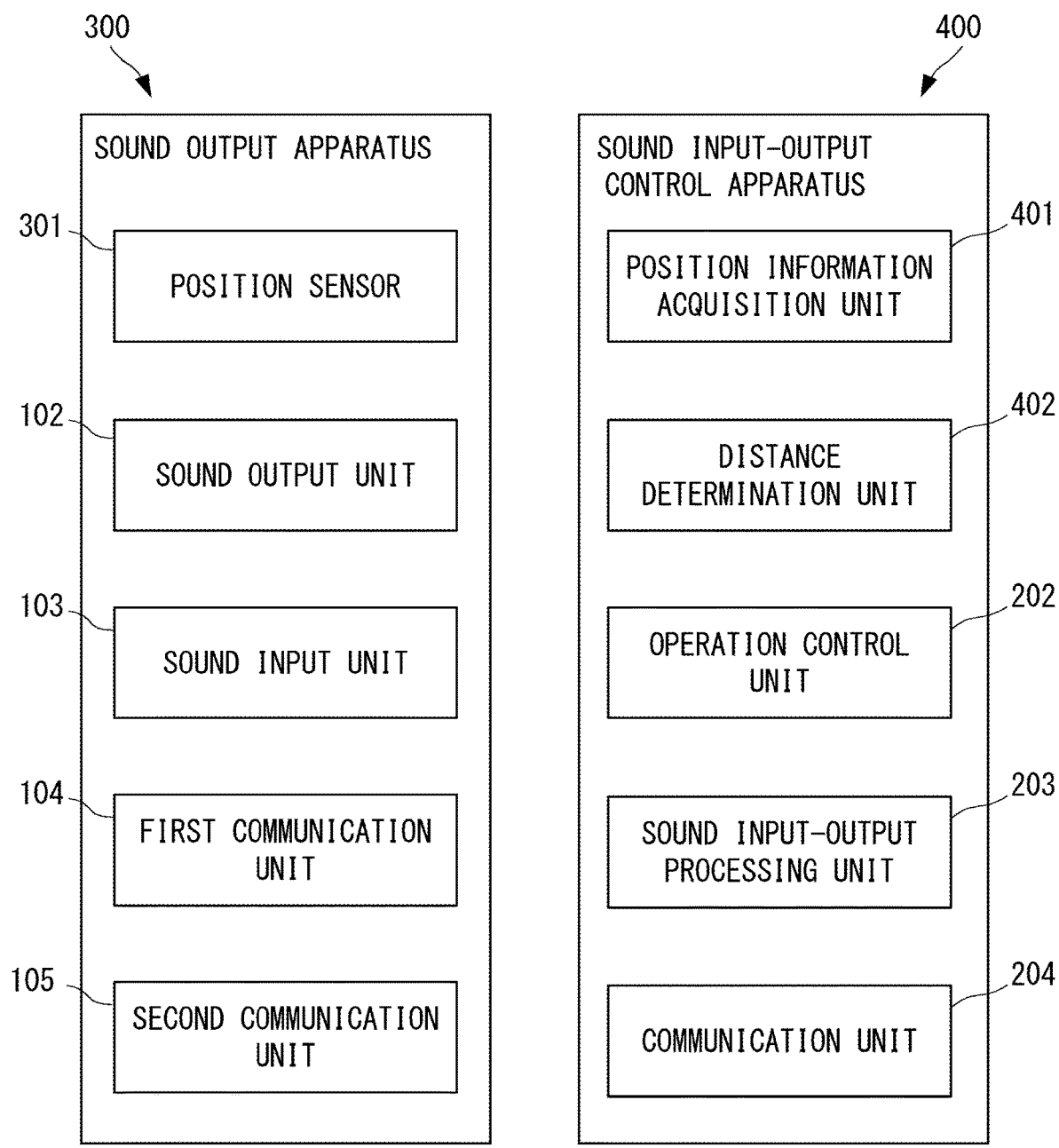
FIG. 5 is a block diagram schematically illustrating the configuration of a sound input-output control apparatus according to a second embodiment of the present invention.

FIG. 5 is a block diagram schematically illustrating the configuration of a sound input-output control apparatus 400 according to a second embodiment of the present invention. Similarly to the first embodiment, the sound input-output control apparatus 400 controls operation of a sound output apparatus 300 illustrated in FIG. 5. Specifically, the sound input-output control apparatus 400 controls a plurality of sound output apparatuses 300 each independently mounted on a user and configured to output sound toward the user. Accordingly, the sound input-output control apparatus 400 can provide wider usage to the sound output apparatuses 300.

As illustrated in FIG. 5, each sound output apparatus 300 according to the second embodiment includes a position sensor 301, the sound output unit 102, the sound input unit 103, the first communication unit 104, and the second communication unit 105. Note that at least one sound output apparatus 100 in the set of sound output apparatuses 100 needs to include the sound input unit 103, and the other sound output apparatuses 100 may include no sound input unit 103. The set of sound output apparatuses 100 may each include no sound input unit 103.

The sound output apparatus 300 is different from the sound output apparatus 100 according to the first embodiment in that the sound output apparatus 300 includes the position sensor 301 in place of the signal state acquisition unit 101. Specifically, the other configuration of the sound output apparatus 300 is the same as that of the sound output apparatus 100 according to the first embodiment. Thus, any component of the sound output apparatus 300, which is the same as that of the sound output apparatus 100 according to the first embodiment is denoted by the same reference sign, and description thereof is omitted.

The position sensor 301 acquires a position signal for calculating the position of a sound output apparatus 300 including the position sensor 301. The position sensor 301 is, for example, a Global Navigation Satellite System (GNSS) receiver or a beacon receiver. When the position sensor 301 is a GNSS receiver, the position sensor 301 acquires, as the position signal, for example, GNSS signals transmitted from four or more GNSS satellites. When the position sensor 301 is a beacon receiver, the position sensor 301 acquires, as the position signal, beacon signals transmitted from a plurality of beacon transmitters. The position signal acquired by the position sensor 301 is transmitted to the sound input-output control apparatus 400 by the first communication unit 104. Note that the position sensor 301 may be included in every sound output apparatus 300 in the set of sound output apparatuses 300 or may be included in only some of the sound output apparatuses 300. When at least one sound output apparatus 300 in the set of sound output apparatuses 300 is disposed at a position in a predetermined distance to a portable instrument or the like, for example, when the sound output apparatus 300 is connected to the portable instrument or the like in a wired manner, the position signal of the portable instrument, which is acquired by the portable instrument may be used as the position signal of the at least one sound output apparatus 300. In this case, the at least one sound output apparatus 300 may include no position sensor 301. Note that the "predetermined distance" for the distance between the at least one sound output apparatus 300 and the portable instrument may be the same as or different from a predetermined distance for the distance among the plurality of sound output apparatuses 300, which is used in determination by a distance determination unit 402.

As illustrated in FIG. 5, the sound input-output control apparatus 400 includes a position information acquisition unit 401, the distance determination unit 402, the operation control unit 202, the sound input-output processing unit 203, and the communication unit 204. The sound input-output control apparatus 400 is different from the sound input-output control apparatus 200 according to the first embodiment in the position information acquisition unit 401 and the distance determination unit 402. Specifically, the other configuration of the sound input-output control apparatus 400 is same as that of the sound input-output control apparatus 200 according to the first embodiment. Thus, any component of the sound input-output control apparatus 400, which is the same as that of the sound input-output control apparatus 200 according to the first embodiment is denoted by the same reference sign, and description thereof is omitted.

The position information acquisition unit 401 calculates position information of each of the plurality of sound output apparatuses 300 based on the position signal transmitted from the sound output apparatus 300. For example, when the position information acquisition unit 401 receives GNSS signals as the position signal, the position of each sound output apparatus 300 is calculated by calculating a signal propagation time based on time information included in each GNSS signal and calculating the distance between the sound output apparatus 300 and a GNSS satellite based on the signal propagation time and position information of the GNSS satellite, which is included in the GNSS signal. When the position information acquisition unit 401 receives beacon signals as the position signal, the position information of each sound output apparatus 300 is calculated based on the position of the corresponding beacon transmitter and the intensity of the corresponding beacon signal.

The distance determination unit 402 determines whether the distance among the plurality of sound output apparatuses 100 is equal to or longer than the predetermined distance based on the position information of each of the plurality of sound output apparatuses 300. Specifically, the distance determination unit 402 calculates the distance among the plurality of sound output apparatuses 300 based on the position information of each sound output apparatus 300, which is calculated by the position information acquisition unit 401, and determines whether the distance among the plurality of sound output apparatuses 300 is equal to or longer than the predetermined distance. The predetermined distance is, for example, 1 m.

Subsequently, an exemplary sound input-output control method according to the second embodiment will be described below with reference to FIG. 6. Note that the following description is made on an example in which the set of sound output apparatuses 300 consists of two sound output apparatuses 300, one of the sound output apparatuses 300 is a master apparatus, and the other sound output apparatus 300 is a slave apparatus. In addition, when the two sound output apparatuses 300 are mounted on the same user, one of the sound output apparatuses 300 is mounted on the left ear and the other sound output apparatus 300 is mounted on the right ear.

Figure 2:
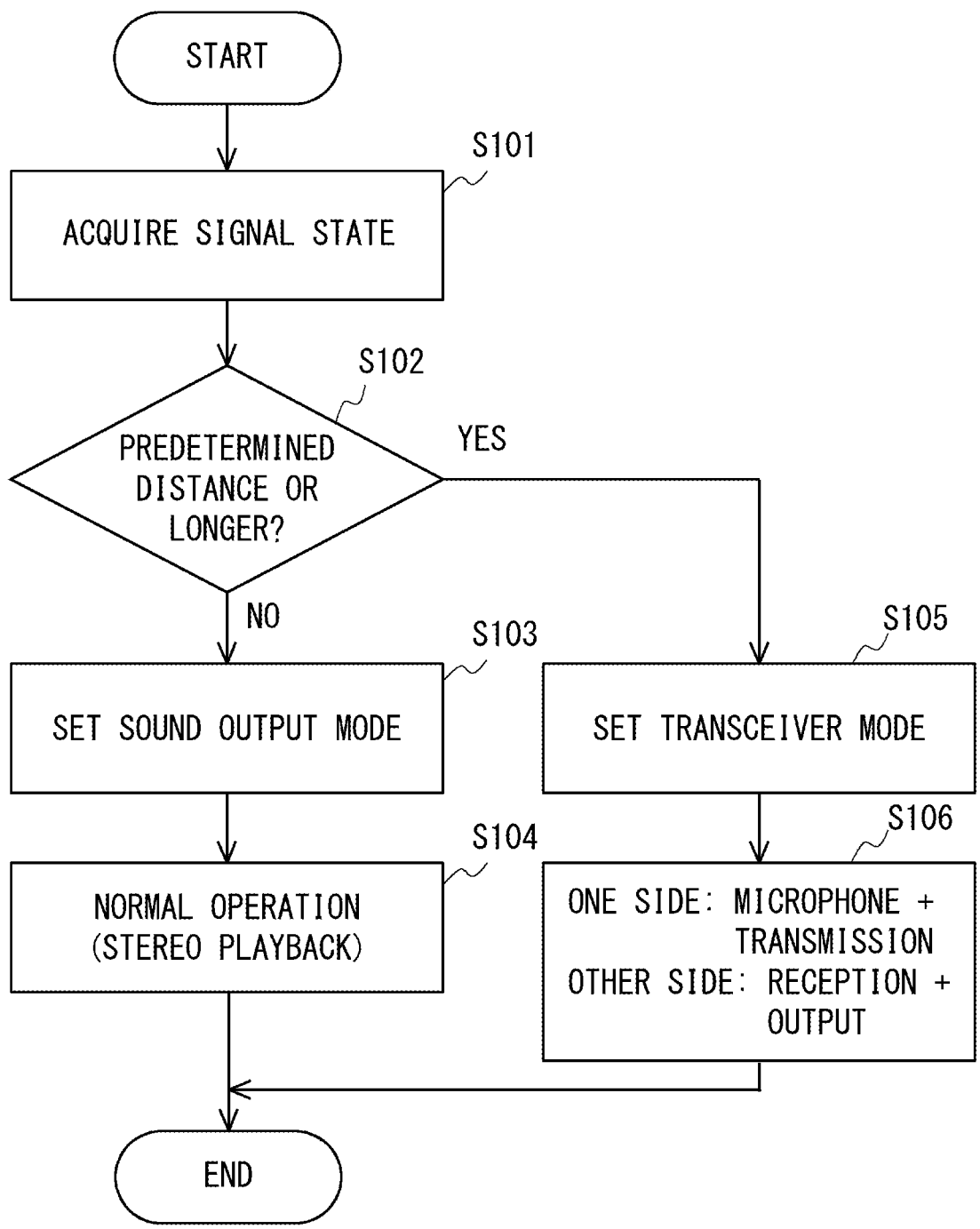
FIG. 2 is a flowchart illustrating an exemplary sound input-output control method according to the first embodiment of the present invention.
Figure 6:
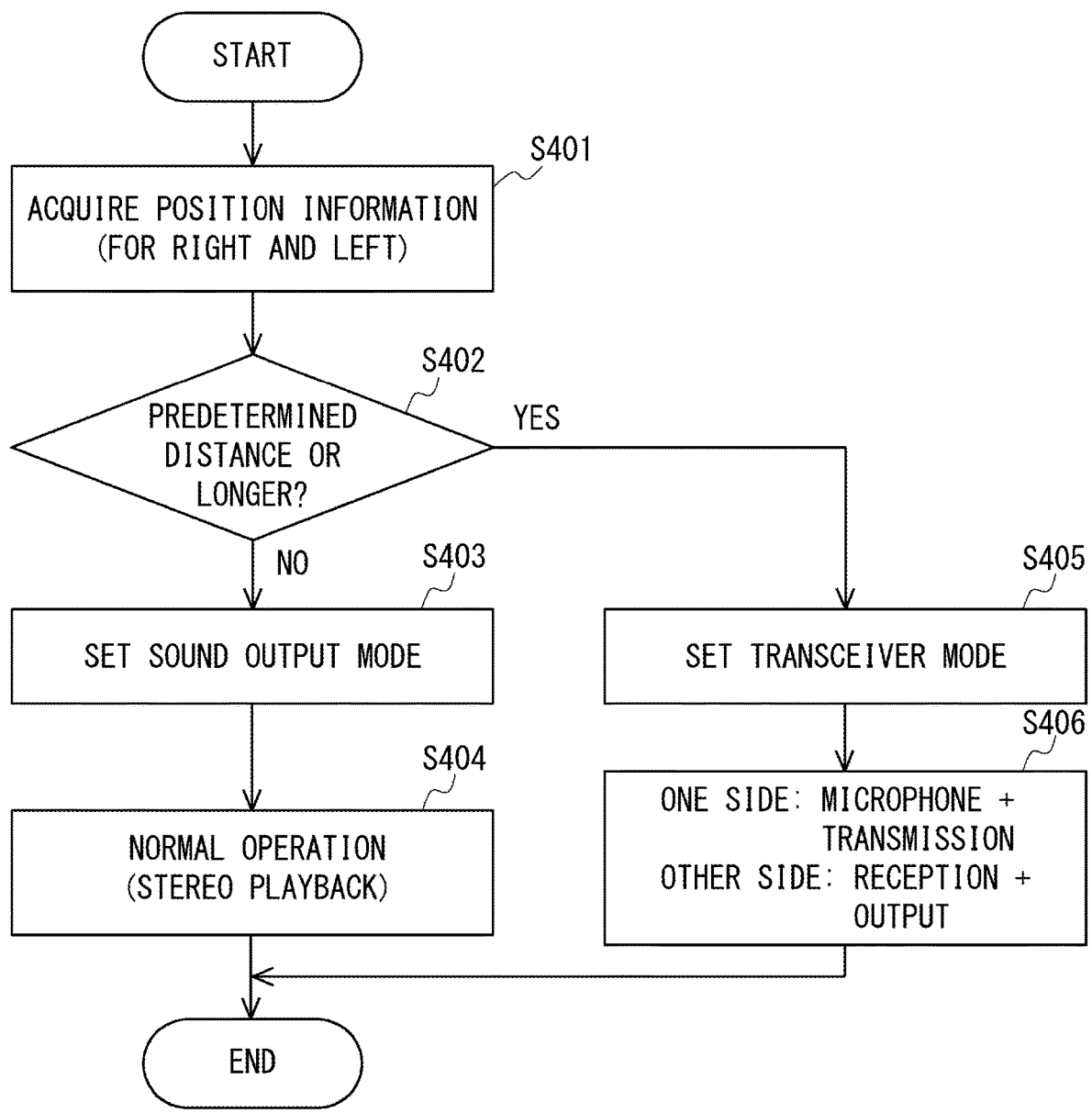
FIG. 6 is a flowchart illustrating an exemplary sound input-output control method according to the second embodiment of the present invention.

In the sound input-output control method illustrated in FIG. 6, processing at steps S403 to S406 is the same as the processing at steps S103 to S106, respectively, of the sound input-output control method illustrated in FIG. 2, and thus description thereof is omitted.

First, the position signal of each of the plurality of sound output apparatuses 300 is transmitted from the sound output apparatus 300 to the sound input-output control apparatus 400, and the position information acquisition unit 401 calculates the position information of each sound output apparatus 300 based on the position signal (step S401).

Subsequently, the distance determination unit 402 determines whether the distance among the plurality of sound output apparatuses 100 is equal to or longer than the predetermined distance based on the position information acquired at step S401 (step S402). Specifically, the distance determination unit 402 calculates the distance among the plurality of sound output apparatuses 300 based on the position information of each sound output apparatus 300, which is calculated at step S401, and determines whether the distance among the plurality of sound output apparatuses 300 is equal to or longer than the predetermined distance.

Figure 3:
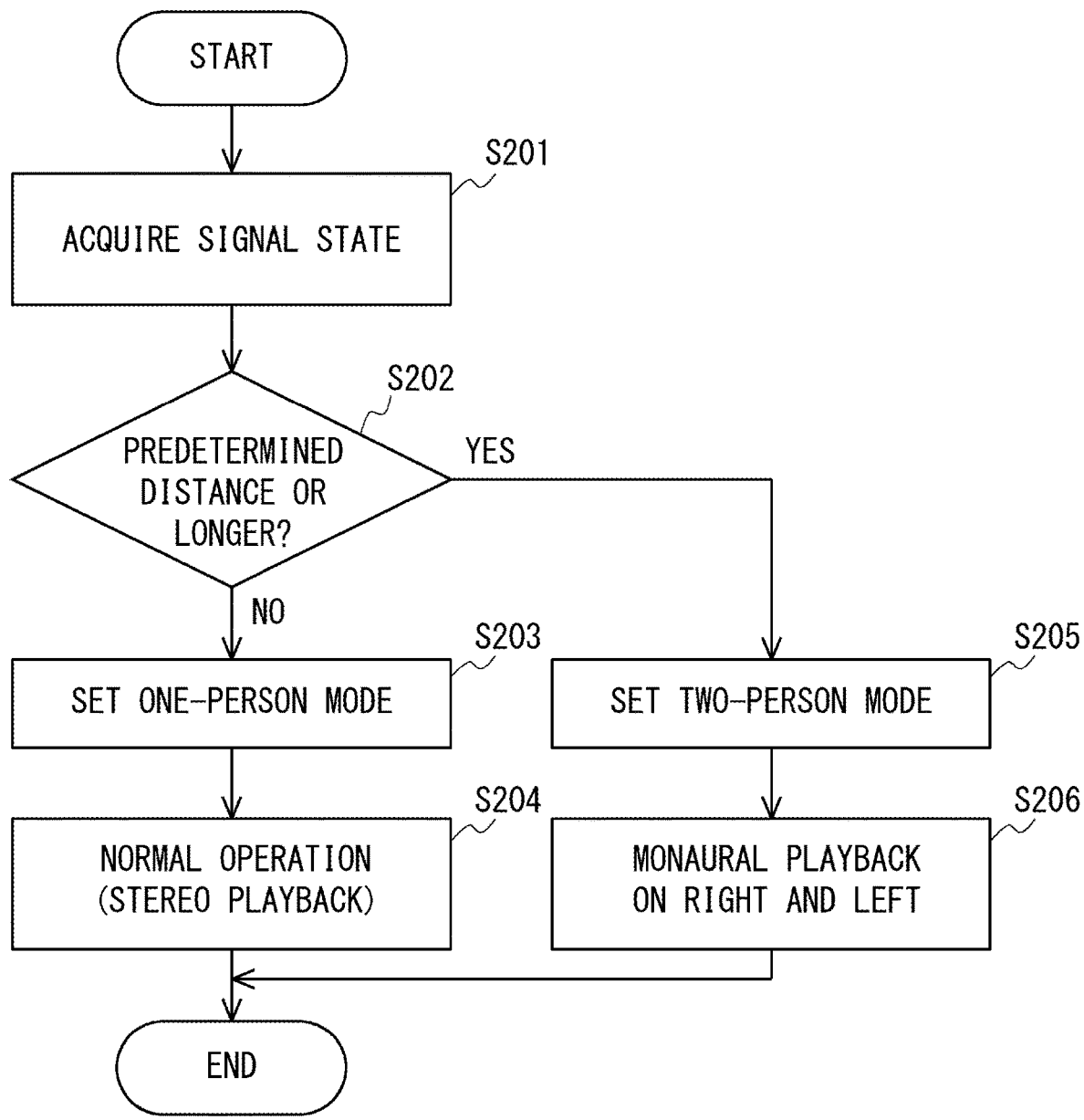
FIG. 3 is a flowchart illustrating another exemplary sound input-output control method according to the first embodiment of the present invention.
Figure 4:
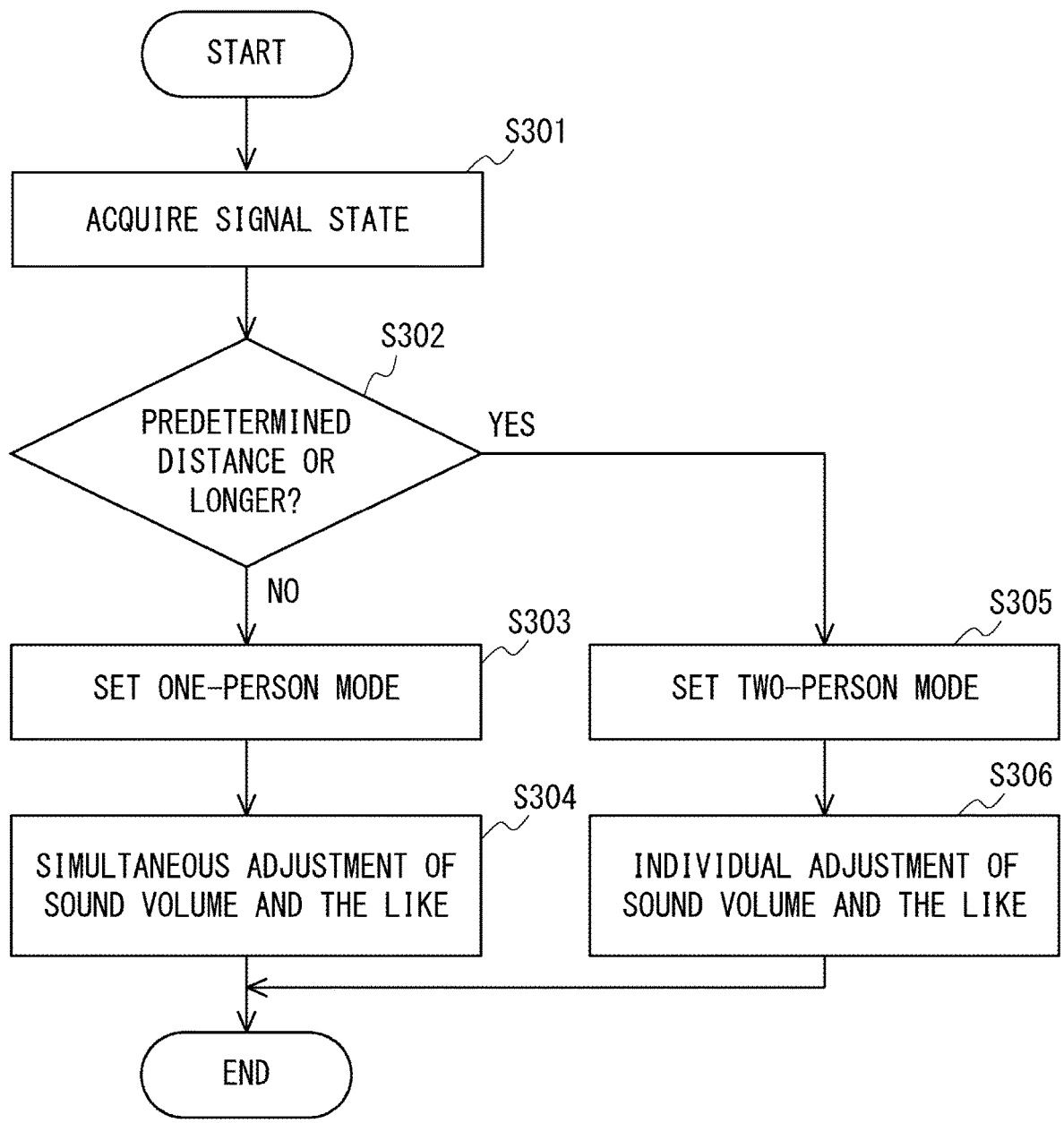
FIG. 4 is a flowchart illustrating another exemplary sound input-output control method according to the first embodiment of the present invention.

Note that the sound input-output control apparatus 400 according to the second embodiment can perform the sound input-output control methods illustrated in FIGS. 3 and 4. Specifically, the sound input-output control apparatus 400 can perform the sound input-output control method illustrated in FIG. 3 by replacing steps S201 and S202 of the sound input-output control method illustrated in FIG. 3 with steps S401 and S402 of the sound input-output control method illustrated in FIG. 6. Similarly, the sound input-output control apparatus 400 can perform the sound input-output control method illustrated in FIG. 4 by replacing steps S301 and S302 of the sound input-output control method illustrated in FIG. 4 with steps S401 and S402 of the sound input-output control method illustrated in FIG. 6.

Figure 7:
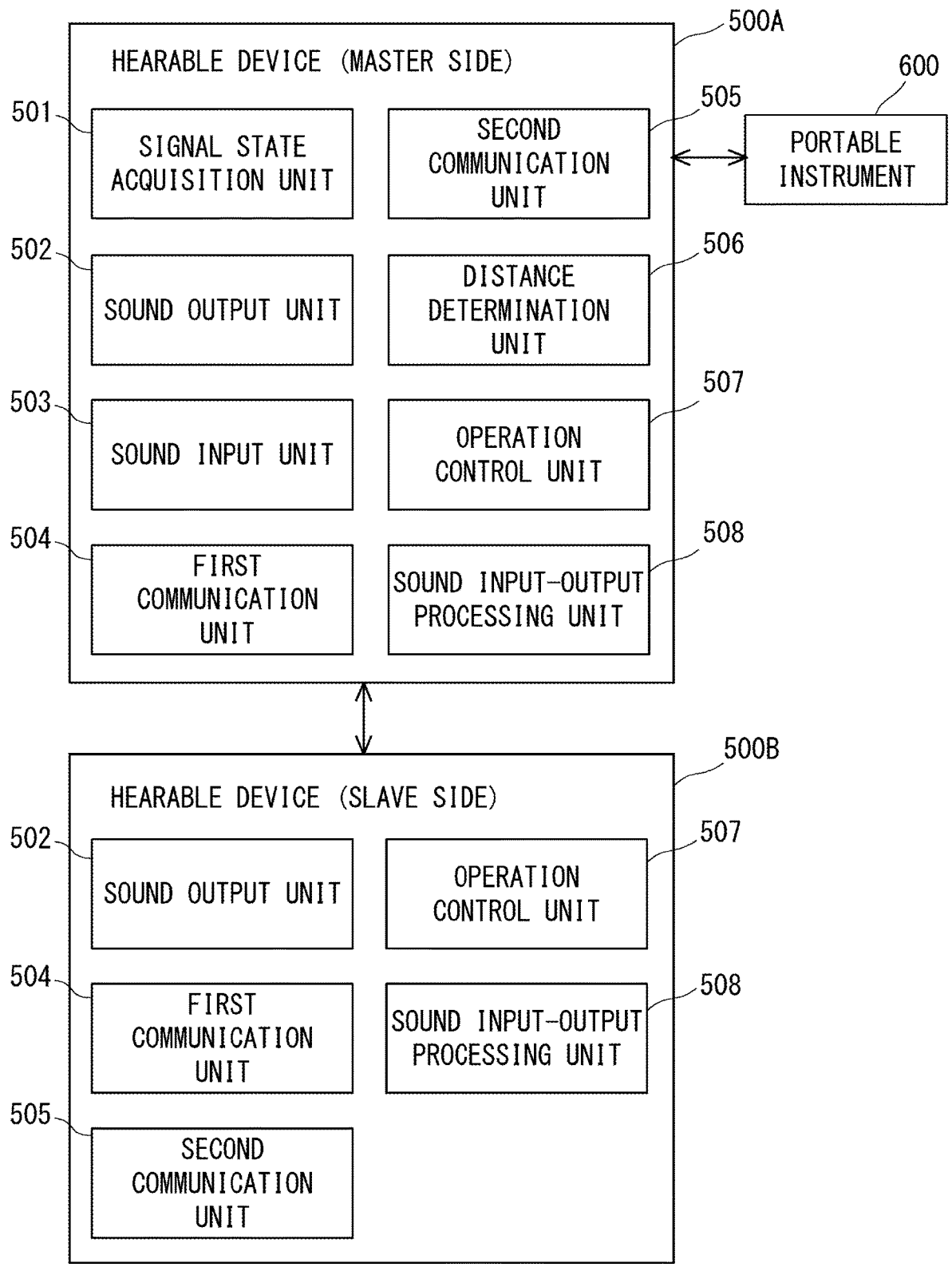
FIG. 7 is a block diagram schematically illustrating another exemplary sound input-output control apparatus according to the first embodiment of the present invention.

Subsequently, another exemplary sound input-output control apparatus 200 according to the first embodiment will be described below with reference to FIG. 7. FIG. 7 is a block diagram schematically illustrating the other exemplary sound input-output control apparatus 200 according to the first embodiment. A hearable device 500A and 500B (hereinafter also referred to as 500) as the sound input-output control apparatus illustrated in FIG. 7 is an integration of each sound output apparatus 100 and the sound input-output control apparatus 200 according to the first embodiment. Accordingly, functions of a signal state acquisition unit 501, a sound output unit 502, a sound input unit 503, a first communication unit 504, a second communication unit 505, a distance determination unit 506, an operation control unit 507, and a sound input-output processing unit 508 included in the hearable device 500 are the same as those of the signal state acquisition unit 101, the sound output unit 102, the sound input unit 103, the first communication unit 104, the second communication unit 105, the distance determination unit 201, the operation control unit 202, and the sound input-output processing unit 203 illustrated in FIG. 1.

Similarly to each sound output apparatus 100 according to the first embodiment, the hearable device 500 is independently mounted on a user and outputs sound toward the user. Specifically, the hearable device 500 is a completely independent individual earphone such as a full-wireless earphone or a full-wireless bone-conduction earphone and is independently mounted on each of the right and left ears of the user. In other words, a plurality of hearable devices 500 are mounted completely independently from each other on the user. Typically, full-wireless earphones, full-wireless bone-conduction earphones, or the like are provided in a set of two completely independent earphones. However, in the present invention, the hearable devices 500 may be provided in a set of three or more hearable devices 500.

Figure 8:
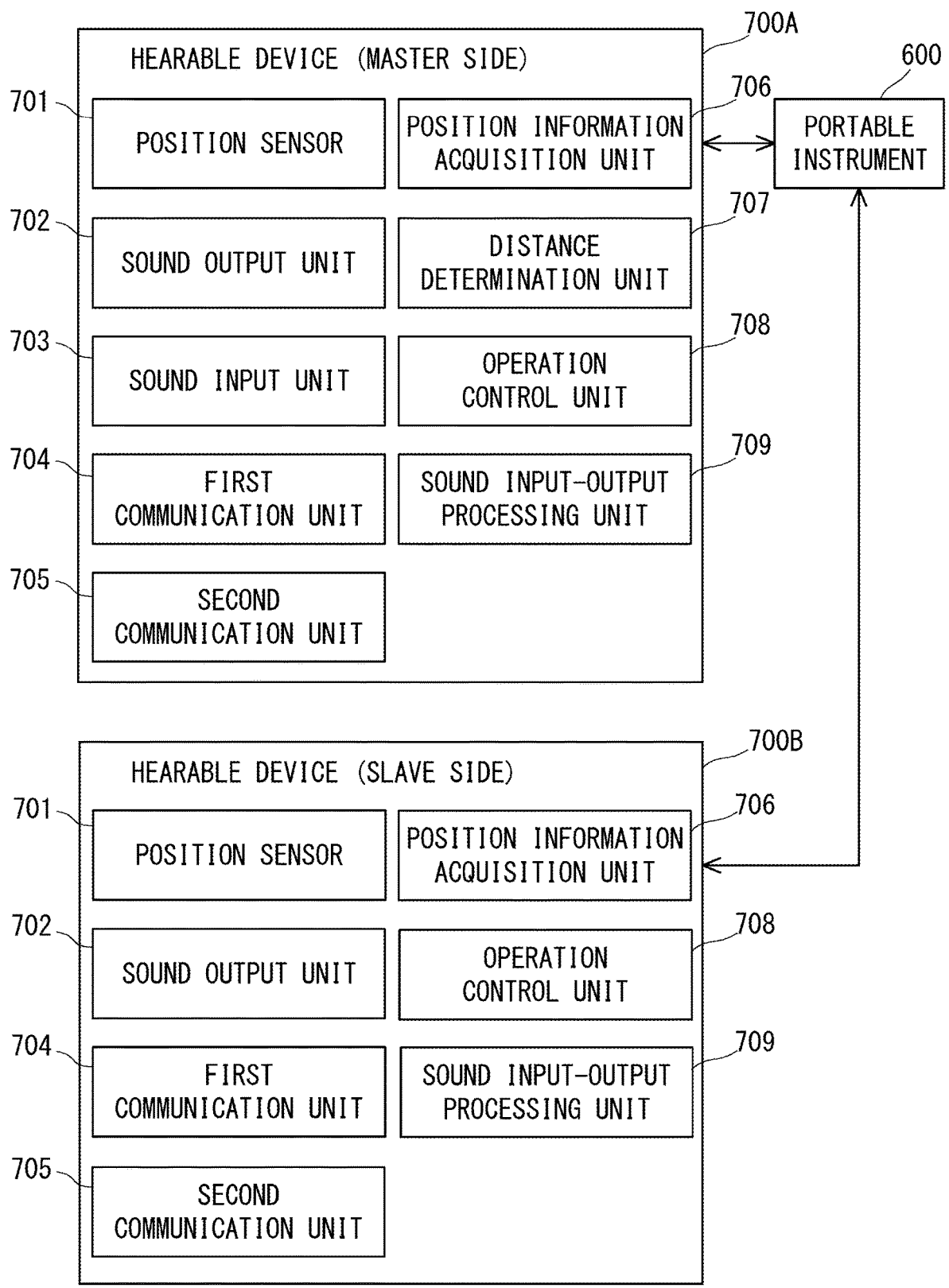
FIG. 8 is a block diagram schematically illustrating another exemplary sound input-output control apparatus according to the second embodiment of the present invention.

Subsequently, another exemplary sound input-output control apparatus 400 according to the second embodiment will be described below with reference to FIG. 8. FIG. 8 is a block diagram schematically illustrating the other exemplary sound input-output control apparatus 400 according to the second embodiment. A hearable device 700A and 700B (hereinafter also referred to as 700) as the sound input-output control apparatus illustrated in FIG. 8 is an integration of each sound output apparatus 300 and the sound input-output control apparatus 400 according to the second embodiment. Accordingly, functions of a position sensor 701, a sound output unit 702, a sound input unit 703, a first communication unit 704, a second communication unit 705, a position information acquisition unit 706, a distance determination unit 707, an operation control unit 708, and a sound input-output processing unit 709 included in the hearable device 700 are the same as those of the position sensor 301, the sound output unit 102, the sound input unit 103, the first communication unit 104, the second communication unit 105, the position information acquisition unit 401, the distance determination unit 402, the operation control unit 202, and the sound input-output processing unit 203 illustrated in FIG. 5.

Similarly to the sound output apparatus 300 according to the second embodiment, the hearable device 700 is independently mounted on a user and outputs sound toward the user. Specifically, the hearable device 700 is a completely independent individual earphone such as a full-wireless earphone or a full-wireless bone-conduction earphone and is independently mounted on each of the right and left ears of the user. In other words, a plurality of hearable devices 700 are mounted completely independently from each other on the user. Typically, full-wireless earphones, full-wireless bone-conduction earphones, or the like are provided in a set of two completely independent earphones. However, in the present invention, the hearable devices 700 may be provided in a set of three or more hearable devices 700.

In the sound input-output control apparatus 200, the hearable device 500, a sound input-output control method, or a computer program according to the first embodiment described above, the distance determination unit 201 or 506 determines whether the distance among a plurality of sound output apparatuses 100 or a plurality of hearable devices 500 is equal to or longer than a predetermined distance (for example, 1 m). When it is determined by the distance determination unit 201 or 506 that the distance among the plurality of sound output apparatuses 100 or the plurality of hearable devices 500 is shorter than the predetermined distance, the operation control unit 202 or 507 controls each sound output apparatus 100 or each hearable device 500 to perform first operation that is suitable for a case in which the sound output apparatuses 100 or the hearable devices 500 are mounted on the same user. When it is determined by the distance determination unit 201 or 506 that the distance among the plurality of sound output apparatuses 100 or the plurality of hearable devices 500 is equal to or longer than the predetermined distance, the operation control unit 202 controls each sound output apparatus 100 or each hearable device 500 to perform second operation that is suitable for a case in which the sound output apparatuses 100 or the hearable devices 500 are mounted on different users.

In the above-described embodiments, the present invention is described as a hardware configuration, but the present invention is not limited thereto. In the present invention, the procedures of processing illustrated in flowcharts in FIGS. 2 to 4 and 6 may be implemented by a central processing unit (CPU) executing a computer program.

The above-described computer program may be stored by using various types of non-transitory computer-readable media and supplied to a computer. The non-transitory computer-readable media include various types of tangible storage media. Examples of the non-transitory computer-readable media include a magnetic storage medium (for example, a flexible disk, a magnetic tape, and a hard disk drive), a magneto-optical storage medium (for example, a magneto optical disc), a CD-ROM (read only memory), a CD-R, a CD-R/W, a semiconductor memory (for example, a mask ROM, a programmable ROM (PROM), an erasable PROM (EPROM), a flash ROM, and a random access memory (RAM)). The computer program may be supplied to a computer through various types of transitory computer-readable media. Examples of the transitory computer-readable media include an electric signal, an optical signal, and an electromagnetic wave. The transitory computer-readable media can supply the computer program to a computer through a wired communication path such as an electrical line or an optical fiber or through a wireless communication path.

Note that the present invention is not limited to the above-described embodiments but may be modified as appropriate without departing from the scope of the invention.

A sound input-output control apparatus, a sound input-output control method, and a computer program that can provide wider usage to sound output apparatuses can be provided.

What is claimed is:

1. A sound input-output control apparatus configured to control a plurality of sound output apparatuses each independently mounted on at least one user to output sound toward the at least one user, the sound input-output control apparatus comprising:
   a distance determination unit configured to determine whether a distance between at least two of the plurality of sound output apparatuses is equal to or longer than a predetermined distance; and
   an operation control unit configured to control each of the sound output apparatuses to perform first operation when it is determined by the distance determination unit that the distance between at least two of the plurality of sound output apparatuses is shorter than the predetermined distance, and control each of the sound output apparatuses to perform second operation when it is determined by the distance determination unit that the distance between at least two of the plurality of sound output apparatuses is equal to or longer than the predetermined distance, wherein:
   at least one of the sound output apparatuses includes a sound input unit configured to collect voice of a user on which the one sound output apparatus is mounted;
   the operation control unit controls the one sound output apparatus to output a voice signal in accordance with the voice collected by the sound input unit of the one sound output apparatus to any other sound output apparatus when it is determined by the distance determination unit that the distance between at least two of the plurality of sound output apparatuses is equal to or longer than the predetermined distance; and
   the operation control unit controls the other sound output apparatus to receive the voice signal and to output the voice toward the user in accordance with the voice signal.

2. The sound input-output control apparatus according to claim 1, wherein the distance determination unit determines whether the distance among the plurality of sound output apparatuses is equal to or longer than the predetermined distance based on a signal state in communication between at least two of the plurality of sound output apparatuses.

3. The sound input-output control apparatus according to claim 2, wherein a format of communication used by the distance determination unit for determination of the distance between at least two of the plurality of sound output apparatuses is different from a format of communication used for sound signal transmission and reception between at least two of the plurality of sound output apparatuses.

4. The sound input-output control apparatus according to claim 1, wherein the distance determination unit determines whether the distance among the plurality of sound output apparatuses is equal to or longer than the predetermined distance based on position information of each of at least two of the plurality of sound output apparatuses.

5. A sound input-output control method in which a plurality of sound output apparatuses each independently mounted on at least one user to output sound toward the at least one user are controlled by a sound input-output control apparatus, wherein the sound input-output control apparatus:
   determines whether a distance between at least two of the plurality of sound output apparatuses is equal to or longer than a predetermined distance,
   controls each of the sound output apparatuses to perform first operation when having determined that the distance between at least two of the plurality of sound output apparatuses is shorter than the predetermined distance, and
   controls each of the sound output apparatuses to perform second operation when having determined that the distance between at least two of the plurality of sound output apparatuses is equal to or longer than the predetermined distance, wherein:

at least one of the sound output apparatuses includes a sound input unit configured to collect voice of a user on which the one sound output apparatus is mounted;

the sound input-output control apparatus controls the one sound output apparatus to output a voice signal in accordance with the voice collected by the sound input unit of the one sound output apparatus to any other sound output apparatus when it is determined that the distance between at least two of the plurality of sound output apparatuses is equal to or longer than the predetermined distance; and the sound input-output control apparatus controls the other sound output apparatus to receive the voice signal and to output the voice toward the user in accordance with the voice signal.

6. A non-transitory computer-readable medium that stores a computer program that causes a sound input-output control apparatus to execute processing of controlling a plurality of sound output apparatuses each independently mounted on at least one user to output sound toward the at least one user, the computer program causing the sound input-output control apparatus to execute;

processing of determining whether a distance between at least two of the plurality of sound output apparatuses is equal to or longer than a predetermined distance; and processing of controlling each of the sound output apparatuses to perform first operation when having determined that the distance between at least two of the plurality of sound output apparatuses is shorter than the predetermined distance, and controlling each of the sound output apparatuses to perform second operation when having determined that the distance between at least two of the plurality of sound output apparatuses is equal to or longer than the predetermined distance, wherein:

at least one of the sound output apparatuses includes a sound input unit configured to collect voice of a user on which the one sound output apparatus is mounted;

the computer program further causes the sound input-output control apparatus to execute:

processing of controlling the one sound output apparatus to output a voice signal in accordance with the voice collected by the sound input unit of the one sound output apparatus to any other sound output apparatus when it is determined that the distance between at least two of the plurality of sound output apparatuses is equal to or longer than the predetermined distance; and processing of controlling the other sound output apparatus to receive the voice signal and to output the voice toward the user in accordance with the voice signal.

7. The sound input-output control apparatus according to claim 1, wherein the operation control unit controls either the one sound output apparatus or the other sound output apparatus to stop voice collection by the sound input unit at the one sound output apparatus or the other sound output apparatus when it is determined by the distance determination unit that the distance between at least two of the plurality of sound output apparatuses is equal to or longer than the predetermined distance.

* * * * *